(12) United States Patent
Lawson (10) Patent No.: US 8,042,641 B2
(45) Date of Patent: Oct. 25, 2011

(54) ALL WHEEL DRIVE MOTORCYCLE (76) Inventor: Martin E. Lawson, Somerset, WI (US)

( * ) Notice: Subject to any disclaimer, the term of this patent is extended or adjusted under 35 U.S.C. 154(b) by 0 days.

(21) Appl. No.: 12/700,150

(22) Filed: Feb. 4, 2010

(65) Prior Publication Data
US 2010/0200322 A1 Aug. 12, 2010

Related U.S. Application Data (60) Provisional application No. 61/150,975, filed on Feb. 9, 2009.

(51) Int. Cl.
B62D 61/02 (2006.01)
(52) U.S. Cl. ........................................ 180/224; 180/219
(58) Field of Classification Search .................. 180/222, 180/223, 224, 227
See application file for complete search history.

(56) References Cited

U.S. PATENT DOCUMENTS

| | | | | |
|---|---|---|---|---|
| 3,045,772 A | * | 7/1962 | Nicolai | 180/224 |
| 3,268,025 A | * | 8/1966 | Fehn | 180/224 |
| 3,642,083 A | * | 2/1972 | Rodler, Jr. | 180/224 |
| 3,746,113 A | * | 7/1973 | Tidwell | 180/224 |
| 4,265,329 A | | 5/1981 | De Cortanze | |
| 4,702,340 A | * | 10/1987 | Hamilton | 180/224 |
| 4,712,638 A | | 12/1987 | Kawaguchi | |
| 5,014,808 A | | 5/1991 | Savard et al. | |
| 5,042,608 A | | 8/1991 | Horiike et al. | |
| 5,054,572 A | * | 10/1991 | Parker | 180/224 |
| 5,113,964 A | * | 5/1992 | Yamauchi | 180/224 |
| 5,224,725 A | | 7/1993 | Erlston | |
| 5,253,889 A | | 10/1993 | Kaminski | |
| 5,324,057 A | | 6/1994 | Chartrand | |
| 5,485,893 A | * | 1/1996 | Summers | 180/219 |
| 5,782,313 A | * | 7/1998 | Kurawaki et al. | 180/219 |
| 5,873,428 A | | 2/1999 | Ohshita et al. | |
| 6,182,991 B1 | * | 2/2001 | Christini et al. | 280/230 |
| 6,505,699 B1 | | 1/2003 | Christini et al. | |
| 7,338,061 B2 | | 3/2008 | Bullis | |
| 7,468,018 B2 | | 12/2008 | Radich | |
| 7,468,587 B2 | | 12/2008 | Shkondin | |
| 7,487,854 B2 | * | 2/2009 | Christini et al. | 180/224 |
| 7,775,314 B2 | * | 8/2010 | Blais et al. | 180/224 |

(Continued)

FOREIGN PATENT DOCUMENTS

JP 03-099720 11/2003

(Continued)

*Primary Examiner* — Paul N Dickson
*Assistant Examiner* — Tashiana Adams
(74) *Attorney, Agent, or Firm* — Westman, Champlin & Kelly (57) ABSTRACT

An all wheel drive motorcycle includes an internal combustion engine having an output shaft extending from the engine. A back wheel drive train is coupled to the output shaft with either a first chain or a first shaft. The first chain or the first shaft couples to a rear wheel drive sprocket or a rear wheel drive gear that couples to the first chain or first shaft, respectively. The motorcycle includes a front wheel drive train that extends from the output shaft to a universal joint that is positioned on the motorcycle within a range of about plus or minus ten degrees of perpendicular to the steering axis of rotation of the front fork where the front fork supports and retains the front wheel. The universal joint and the output shaft are coupled together with either a second drive chain or a second drive shaft. The universal joint includes a stub shaft having a front wheel drive sprocket engaging a front wheel drive chain where the front wheel drive chain also engages a front axle sprocket that supplies a drive force to the front wheel.

18 Claims, 6 Drawing Sheets

U.S. PATENT DOCUMENTS

| | | | |
|---|---|---|---|
| 2005/0173176 A1* | 8/2005 | Christini et al. | 180/224 |
| 2006/0185912 A1 | 8/2006 | Bullis | |
| 2006/0213713 A1 | 9/2006 | Takenaka | |
| 2007/0049460 A1 | 3/2007 | Kolev | |
| 2008/0100027 A1* | 5/2008 | Christini et al. | 280/279 |

FOREIGN PATENT DOCUMENTS

| | | |
|---|---|---|
| WO | 93/11991 | 6/1993 |

* cited by examiner

ALL WHEEL DRIVE MOTORCYCLE

CROSS REFERENCE TO RELATED APPLICATION(S)

The present application claims the benefit of U.S. Provisional Application Ser. No. 61/150,975 that was filed on Feb. 9, 2008, the content of which is incorporated by reference in its entirety.

FIELD OF THE INVENTION

The present invention relates to a two-wheel vehicle such as a motorcycle. More particularly, the present invention relates to an all wheel drive motorcycle.

BACKGROUND OF THE INVENTION

Many people enjoy riding motorcycles on the road as well as off road. When driving a motorcycle off road, the motorcycle typically encounters rough terrain and obstacles. Many times the driver will have difficulty maintaining the control of the motorcycle when encountering the rough terrain and obstacles because the front wheel suspension cannot adequately adjust to compensate for the unevenness of the terrain or the height of the obstacle.

One way to maintain control of a motorcycle while riding off road is to provide a drive force to the front wheel. When a drive force is imparted on the front wheel, the front wheel actively engages the obstacle or uneven terrain. The active engagement of the front wheel with the obstacle or uneven terrain allows the driver maintain better control of the motorcycle when compared to a single wheel drive motorcycle encountering the same obstacle. However, as a front wheel of an all wheel drive motorcycle is turned or cornered, a torque steer is typically created if the drive system is not designed to eliminate torque steer which makes turning an all wheel drive motorcycle very difficult.

An all wheel drive motorcycle can also encounter bump steer when the front wheel engages an obstacle. Bump steer is the unwanted turning of the front wheel and fork caused by the front wheel drive train when the front wheel engages the obstacle.

Also, a typical suspension for a front wheel of a motorcycle includes shock absorbers such as compression spring(s) located within the front fork. As the front wheel engages an obstacle or uneven terrain, the compression springs compresses to absorb some of the shock caused by the engagement of the wheel with the obstacle or uneven terrain. As the compression spring compresses and expands, the distance between the axle supporting the wheel and the top of the fork varies. The front wheel drive train must compensate for the change in distance between the top of the fork and the axle.

When utilizing a shaft drive as the front wheel drive train, a telescoping multi-part shaft is typically utilized to compensate for the change in distance between the axle and the top fork. However, a telescoping multi-part shaft causes unnecessary complexities and potential mechanical failures while needing a separate system to compensate for the torque steer when turning the all wheel drive motorcycle.

A chain drive can also be utilized to provide power to the front wheel. Typically a tensioning sprocket is utilized to compensate for the change in distance between the top of the fork and the axle. A position of the tensioning sprocket typically adjusts to compensate for slack in the chain caused by the change in distance between the top of the fork and the axle such that the chain is at a substantially constant tension while the front wheel engages the obstacles or rough terrain. However, the chain drive on the front wheel having a tensioning sprocket is complex and subject to mechanical failure while not alleviating the issue regarding torque steer.

SUMMARY OF THE INVENTION

The present invention includes an all wheel drive motorcycle. The motorcycle includes an internal combustion engine having an output shaft extending from the engine. A back wheel drive train is coupled to the output shaft with either a rear wheel drive chain or a rear wheel drive shaft. The motorcycle includes a front wheel drive train that extends from the output shaft to a universal joint that is positioned on the motorcycle within a range of about ten (10) degrees from perpendicular to the axis of rotation of the front fork where the front fork supports and retains the front wheel. The universal joint and the output shaft are coupled together with either a second drive chain or a second drive shaft. The front wheel drive chain or front wheel drive shaft engages a front axle sprocket or gear such that a drive force is supplied to the front wheel.

The present invention also includes a suspension that attaches the front wheel of a motorcycle to the frame. The suspension includes a top suspension arm and a bottom suspension arm that are separated a selected distance from each other. The top suspension arm includes a fork attachment end having a fork attachment mechanism that engages the front fork. The top suspension arm also includes spaced apart top frame attachment mechanisms that secure the top suspension member to the frame. The bottom suspension arm is substantially of the same configuration of the top suspension arm wherein a bottom fork attachment end is attached to the front fork and the spaced apart bottom frame attachment ends attach to the frame. The suspension includes a coil spring shock absorber that attaches to the frame and one of the suspension arms such that a shock absorber is not necessary within the front fork.

DETAILED DESCRIPTION

Figure 1:
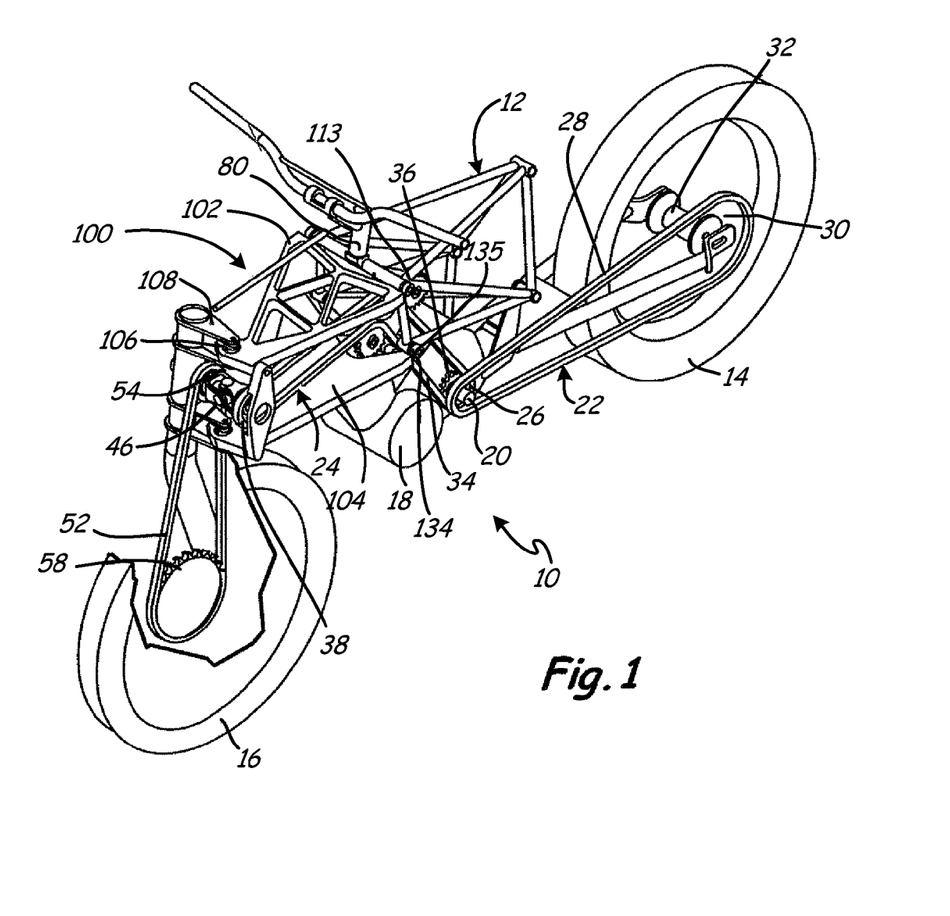
FIG. 1 is a perspective view of an all wheel drive motorcycle.

An all wheel drive motorcycle is generally illustrated in FIG. 1 at 10. The motorcycle 10 includes a frame 12 that supports an internal combustion engine 18, a rear wheel 14 and a front wheel 16. An output shaft 20 extends from the engine 18 where the output shaft 20 provides power to the back wheel 14 and the front wheel 16 through a back wheel drive train 22 and a front wheel drive train 24, respectively.

Figure 2:
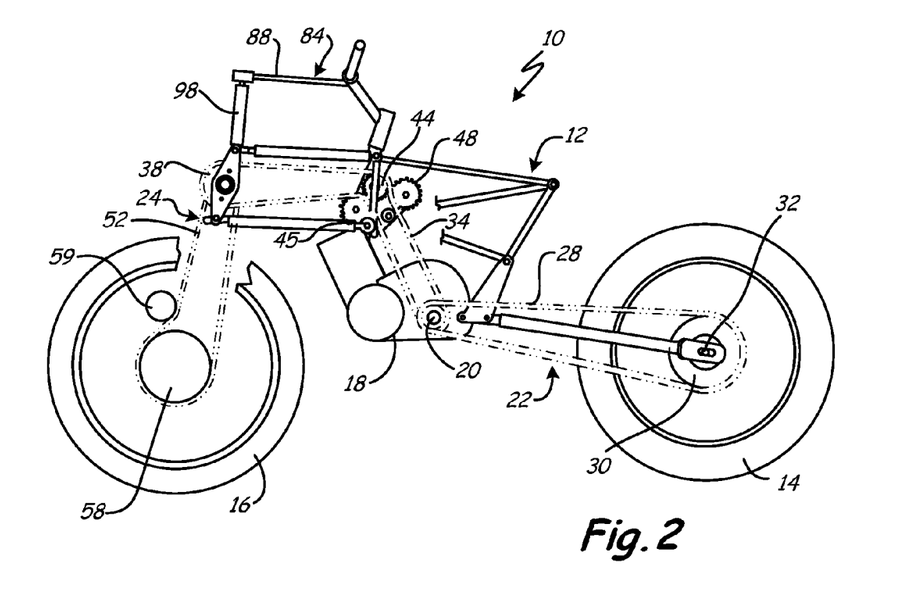
FIG. 2 is a plan view of a chain drive of the all wheel drive motorcycle.

Referring to FIGS. 1 and 2, the rear wheel drive train 22 includes a first output shaft drive sprocket 26 non-rotatably attached to the output shaft 20. A rear wheel drive chain 28 is attached to the first output shaft drive sprocket 26 and a rear axle sprocket 30 that is non-rotatably attached to a back hub 32. The rear wheel 14 is non-rotatably attached to the rear hub 32 such that the rear wheel drive train 22 transfers force from the engine 18 through the output shaft 20 to the back wheel 14 of the motorcycle 10.

Referring to FIGS. 1-5, the front wheel drive train 24 provides power to the front wheel 16 typically through a front drive chain 34 that engages a second output shaft drive sprocket 36 selectively rotatably and non-rotatably attached to the output shaft 20 with an overrunning ratchet. The ratchet is located within sprocket 36 on the output shaft 20 but can be anywhere desired in the drive train 24 from the transmission to the front wheel. The front drive chain 34 engages an intermediate fork sprocket 38 that is non-rotatably secured to a left stub shaft 40 where the left stub shaft 40 is positioned proximate a top end of a front fork 42 that supports the front wheel 16. The intermediate fork sprocket 38 is positioned toward a left side of the front fork 42 when looking forward from behind the handle bars.

The path of travel of the front wheel drive chain 34 is typically in an obtuse angled path where a top idling sprocket 44 engages a top segment of the chain 34 and transitions the chain 34 from a slanted path to a substantially horizontal path. A bottom idling sprocket 45 engages a bottom segment of the chain 34 to provide a selected path of travel for the front wheel drive chain 34.

A tensioning sprocket 48 is positioned proximate the top idling sprocket 44. The tensioning sprocket 48 is positioned and retained in a selected position to engage the chain 34. The tensioning sprocket 48 places a selected amount of tension on the chain 34 such that the chain does not become slack and disengage the sprockets 36, 38, 44 and 45.

The left stub shaft 40 is attached to a first portion of a universal joint 46 that is substantially aligned along a longitudinal axis 48 of the stub shaft 49 which is substantially perpendicular to a mid plane 49 of the motorcycle and substantially perpendicular to a rotation axis 50 of the front fork 42. Positioning the universal joint 46 substantially along the axis 48 and perpendicular to the rotational axis 50 of the front fork 42 eliminates the effects of torque steer when turning or bump steer when the front tire engages an obstacle. Torque steer and bump steer typically affects other all wheel drive motorcycle designs when attempting to steer or corner an all wheel drive motorcycle or when the front wheel engages an obstacle.

While the pivot point of the universal joint 46 is typically aligned with the rotational axis 50 of the front fork 42, the rotational axis 48 of the universal joint 46 can also be positioned within range of about +/−10 degrees of perpendicular to the rotational axis 50 of the front fork 42. Maintaining the universal joint 46 within the selected range substantially eliminates the effects of torque steer when turning the front fork 42 and wheel 16 of the all wheel drive motorcycle 10.

A substantially vertical front wheel drive chain 52 is connected to a top front wheel drive sprocket 54 that is non-rotatably attached to a top right stub shaft 56 extending from a second portion of the universal joint 46. The substantially vertical front wheel drive chain 52 also couples with a front wheel hub sprocket 58 that is non-rotatably connected to a front wheel hub 60. A tensioning sprocket 59 is secured to the front fork 42 and engages the chain 52 to place the chain in a selected tension. The chain 52 provides a drive force to the front wheel 16 through the hub 60 which enables the motorcycle 10 to better navigate obstacles and terrain including muddy conditions, snow and ice when compared to a single wheel drive motorcycle.

Separating the front wheel drive chain 34 from the substantially vertical front wheel drive chain 52 with the universal joint 46 allows both drive chains 34 and 52 to be of a constant length because the universal joint 46 pivots to compensate for dimensional changes in the motorcycle caused by steering the front wheel or movement of the suspension. Therefore, the front power drive train 24 does not require telescoping parts or changes in chain length, which increases the reliability of the front power drive train 24 while reducing complexity.

The front power drive train 24 is typically designed with at least a five percent underdrive of the front wheel 16. What is meant by underdrive is that the when both the front wheel and the rear wheel drive trains provide power to the front and rear wheels, the front wheel rotates at a slower revolution per period of time, such as revolutions per minute, when compared to the rear wheel.

The overrunning ratchet allows the front wheel 16 to rotate freely about the axle without engaging the front wheel drive train 24 free until a substantial amount of slippage develops on the rear wheel 14. When the slippage of the rear wheel 14 reaches about 5%, the overrunning ratchet engages the second output shaft drive sprocket 36 such that the back wheel 14 and the front wheel 16 are both providing a driving force to propel the motorcycle. While a 5% underdrive is typical when comparing the front wheel drive train 24 to the rear wheel drive train 22, the underdrive percentage can be varied by utilizing different sprocket diameter ratios.

Figure 3:
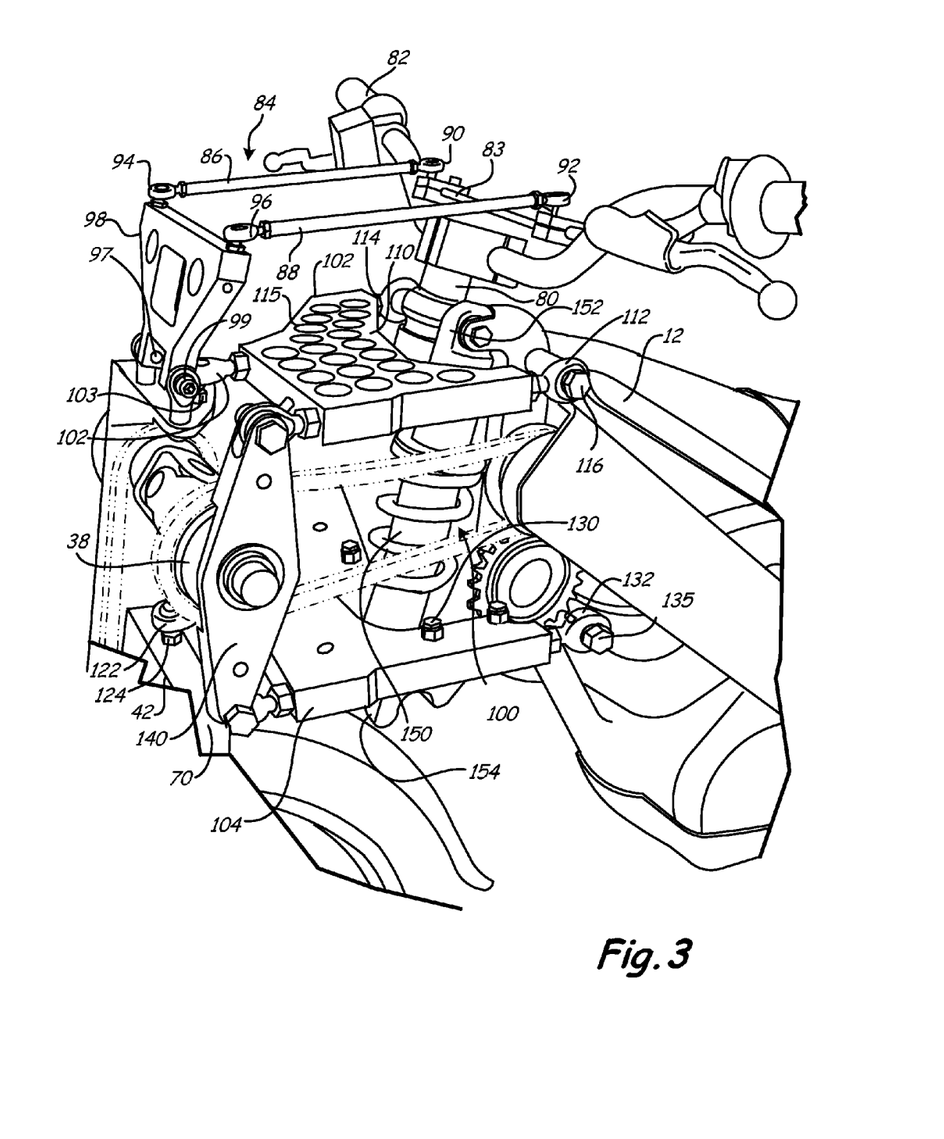
FIG. 3 is a partial perspective view of the front portion of the all wheel drive motorcycle.

Referring to FIGS. 2 and 3, handle bars 82 are rotatably attached to a headstock 80 where the headstock 80 is attached to the frame 12 to provide steering capabilities to the motorcycle 10. A linkage assembly 84 secures a front fork 42 to the handle bars 82 such that the handle bars 82 can manipulate the front fork 42 and front wheel 16 to steer the motorcycle 10.

The linkage assembly 84 includes left and right tie rods 86, 88 that attach to a support rod 83. The support rod 83 is secured to the handle bars 82 at opposite ends of the support rod 83. The tie rods 86 and 88 are attached to the support rod 83 with ball joints 90, 92, respectively such that the ends of the support rods 86 and 88 pivot and rotate with respect to the support rod 83.

Opposite ends 94, 96 of the tie rods 86 and 88 include ball joints that engage pegs extending upwardly from a top surface of a rocker member 98 where the rocker member 98 includes through bores proximate a bottom end through which bolts 97, 99 are inserted to attach the rocker member 98 to the front fork 42. With the rocker member 98 secured to the front fork 42, the rocker member 98 pivots about the bolts 97, 99 while each end of the tie rods 86 and 88 move in three dimensions through the ball joints. Other linkage assemblies for attaching the front fork 42 to the handle bars 82 are also contemplated.

The linkage assembly 84, along with a suspension 100, allows the front fork 42 to be spaced from the headstock 80 such that the front fork 42 and associated equipment can easily replace a standard front fork. The linkage assembly 84 provides the capability to steer the front fork 42 and front wheel 16 while being able to compensate for the movement of the front fork 42 and front wheel 16 due to the unevenness of the terrain or obstacles that are encountered.

Figure 5:
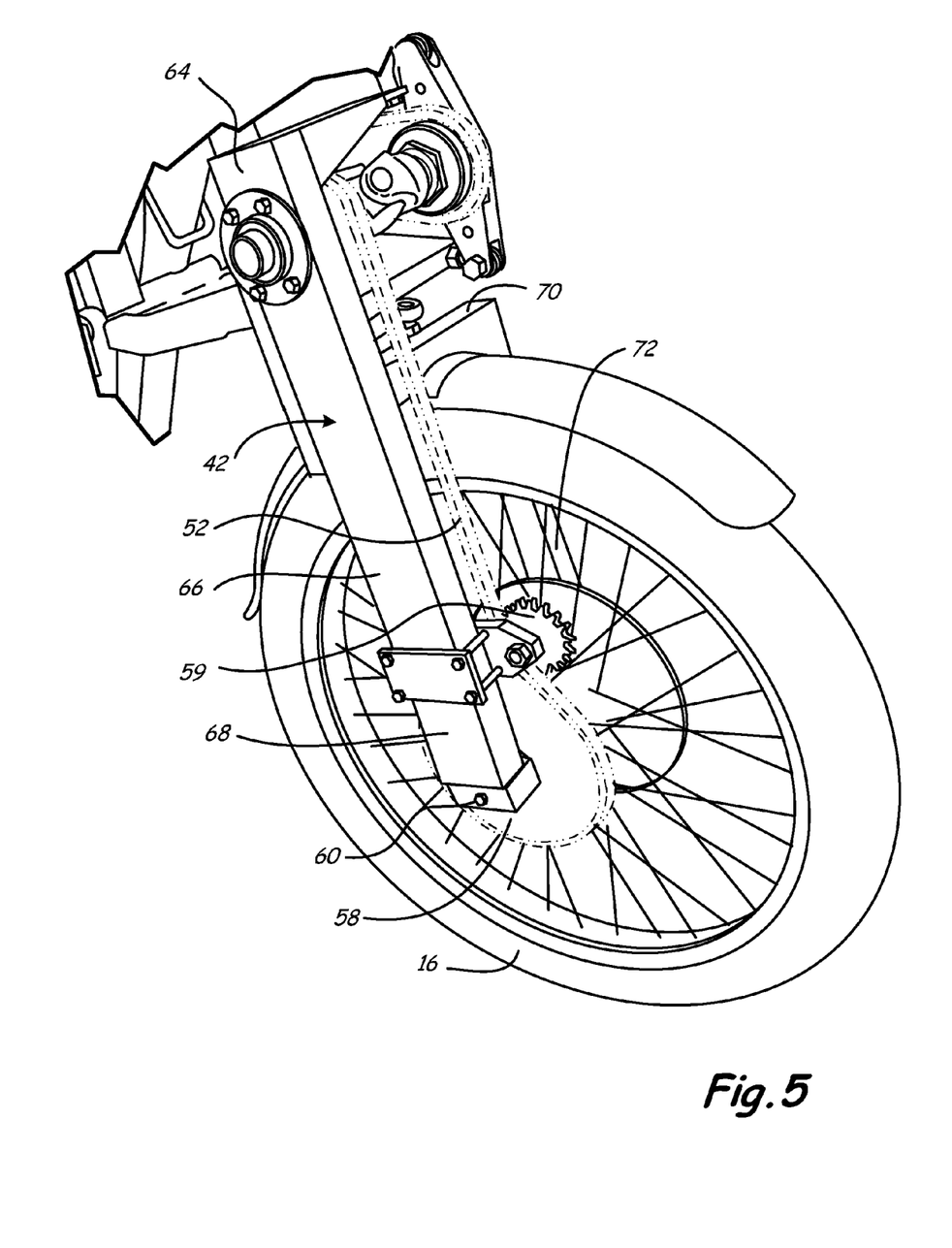
FIG. 5 is a partial perspective view of the front portion of the all wheel drive motorcycle.

Referring to FIG. 5, the front fork 42 includes a right side portion 66 extending from the top portion 64 where the right side portion includes an aperture at a distal end 68 that is positioned about the front wheel axle 60 to secure the right side portion 66 the front wheel axle 60. The front fork 42 includes a horizontal portion 70 extending substantially perpendicularly from the top portion 64. A left side portion 72 is attached to the horizontal portion 70 and extending downwardly on the left side of the front wheel. The left side portion 72 includes an aperture at a distal end that engages the right end of the front axle 60 similar to the construction of the right side portion. The front fork 42 is generally in the shape of the letter "h" and provides sufficient clearance to allow any typically constructed motorcycle to be retrofitted with the front wheel drive train 24.

Figure 4:
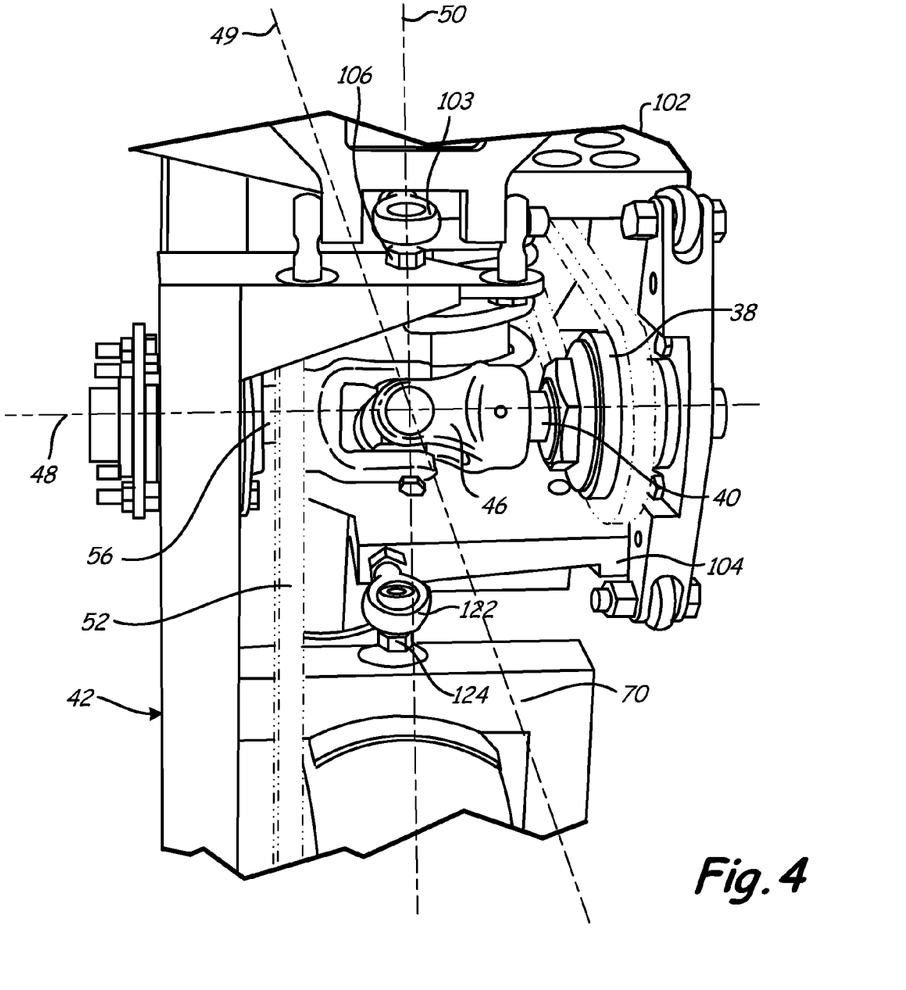
FIG. 4 is a partial front view of a portion of the front wheel drive train of the all wheel drive motorcycle.

Referring to FIGS. 3 and 4, a suspension 100 for the front wheel of the motorcycle includes upper and lower suspension arms 102 and 104, respectively, that pivotally connect the frame 12 to the front fork 42. The suspension 100 includes a coil spring shock absorber 150 where a top end 152 attaches to the frame proximate the headstock 80 and a bottom end 154 attaches to a bracket 103 extending from the lower suspension arm 104. By attaching the coil spring shock absorber 150 to the suspension 100 at the lower suspension arm 104, the front fork 42 is not required to include shock absorbing capabilities such that the front fork 42 has a rigid construction. The stiffness of the suspension 100 can be adjusted by either adjusting the tension on the coil spring in the shock absorber 150 or by replacing the shock absorber 150. The coil spring shock absorber 150 could also be attached to the upper suspension arm 102 instead of the lower suspension arm 104.

A rigid construction of the front fork 42 and the dynamics of the four bar linkage suspension design 100 prevent the front end of the motorcycle 10 from rising during acceleration or dropping during deceleration. Preventing the front end from rising and dropping during acceleration and deceleration, respectively, allows the driver to maintain better control of the motorcycle 10.

The upper suspension arm 102 includes an upper front mounting bracket 103 that is pivotally attached to the front fork 42 with a pivot pin 106. The pivot pin 106 extends substantially vertically from the top portion 64 of the front fork 42 and through a through bore in the upper front mounting bracket 103. The position of the pivot pin 106 is substantially aligned with the rotational axis 50 of the front fork 42 which is also aligned with the contact patch of the front tire with the ground such that the front fork 42 can pivot about the pivot pin 106 when the front fork 42 and the front wheel 16 are steered. If the rotational axis and the contact patch for the tire are not aligned, the attachment point of the upper suspension arm 102 to the front fork 42 is aligned with the contact patch of the front tire with the ground.

The back end 110 of the upper suspension arm 102 includes left and right upper spaced apart frame mounting brackets 112 and 114 having through bores that are aligned with threaded bores in the frame 12 such that a bolt, one of which is shown at 116, can be inserted through the through each bore in the upper spaced apart mounting brackets 112 and 114 and threadably engage the threaded bores with in the frame to pivotally secure the back end 110 of the upper suspension arm 102 to the frame 12. The back end 110 includes a cut out portion that provides clearance for the coil spring shock absorber 150 and the headstock 80.

The upper front mounting bracket 102 is located on the front end of the upper suspension arm 102 above the universal joint 46 such that the attachment point of the upper suspension arm 102 to the front fork 42 is substantially aligned with the rotation axis 50 and substantially perpendicular to the axis 48 of the universal joint 46. The combination of the suspension 100 and the front wheel drive train 22 provides power to the front wheel 16 in an efficient manner while substantially eliminating torque steer and bump steer.

The upper suspension arm 102 includes voids 115 that reduce the weight of the arm 102. However, any configuration of voids appropriate to the stresses sustained by arm 102 could be used or not used.

The lower suspension arm 104 includes a lower front mounting bracket 122 that is pivotally attached to the front fork 42 with a pivot pin 124. The pivot pin 124 extends substantially vertically from the horizontal portion 70 of the front fork 42 and through a through bore in the lower front mounting bracket 102.

The back end 130 of the lower suspension arm 104 includes left and right bottom spaced apart mounting brackets, one of which is illustrated at 132. The mounting brackets have through bores that are aligned with threaded bores in the frame 12 such that a bolt, one of which is shown at 135, can be inserted through the through each bore in the lower spaced apart mounting brackets 132 and threadably engage the threaded bores with in the frame to pivotally secure the back end 130 of the lower suspension arm 104 to the frame 12. The back end 10 of the lower suspension arm 104 includes a cut out portion that provides clearance for the coil spring shock absorber 150.

The lower front mounting bracket 122 is located on the front end of the lower suspension arm 104 below the universal joint 46. The position of the pivot pin 124 within the lower mounting bracket 122 is substantially aligned with the rotational axis 50 of the front fork 42 and the contact patch of the front tire such that the front fork 42 while being substantially perpendicular to the axis 48. The location of the rotational axis 50 with respect to the axis 48 along with the suspension 100 substantially eliminates torque steer and bump steer.

The lower suspension arm 104 typically is of a solid construction. However, the lower suspension arm could also include voids that reduce the weight of the arm 104.

Each suspension arm 102 and 104 include a mounting point for an outboard bearing support link 140 having an aperture to support for the intermediate fork sprocket 38 and maintains the stub shaft 40 substantially perpendicular to the steering axis and parallel to the engine output shaft. The configuration of the upper and lower suspension arms 102 and 104 also allow the front fork 42 and the substantially vertical front wheel drive chain 52 to clear the suspension arms 102 and 104 as the suspension 100 moves and the front wheel 16 turns.

Because the intermediate fork sprocket 38 is attached to the moving suspension arms 102 and 104, the intermediate fork sprocket 38 also moves. Typically, it is difficult to compensate for the movement of a sprocket in a chain drive. However, due to the placement of the top idling sprocket 44 and the bottom idling sprocket 46 in relation to the intermediate fork sprocket 38 and the diameters of the sprockets 38, 44 and 46, even though the intermediate fork sprocket 38 moves with the suspension arms 102 and 104, the length of the front wheel drive chain 34 remains substantially constant throughout the range of travel of the suspension arms 102 and 104. As such a constant length chain 34 can be utilized which further reduces the complexities of the all wheel drive motorcycle.

Each of the suspension arms 102 and 104 has a slanted outer surface on the side where the top portion 64 of the front fork 42 is located. As the top portion 64 of the front fork 42 is located a distance from the rotational axis 50, the top portion 64 moves in an arcuate path when the front fork 42 is rotated. With the upper portion 64 located on the right side of the rotational axis 50, as the front fork 42 is rotated to the right the upper portion 64 moves toward the suspension arm 102 and 104. The slanted outer surfaces of the suspension arms 102 and 104 provide the necessary clearance to allow the front fork 42 to rotate through a typical range of motion.

Figure 6:
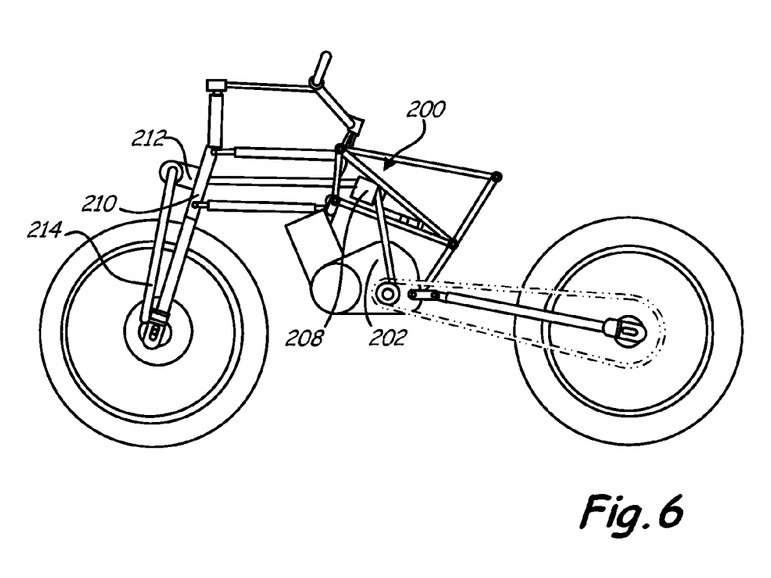
FIG. 6 is a schematic view of a combination chain and shaft drive train of an all wheel drive motorcycle.

Referring to FIG. 6, a shaft drive train 200 can also be utilized to transmit power to the front wheel instead of a chain drive system. The front drive train includes a shaft 202 that engages the output shaft. A distal end of the shaft 202 engages a right angle gearbox 208. The gearbox 208 typically houses the overrunning clutch, and an overload clutch. The drive system can be configured to provide the underdrive which is typically about 5%.

A shaft 210 extends from the gearbox 208 toward the front fork. A universal joint is typically attached to the shaft 210 at a location where the pivot point of the universal joint is coincident with the rotational axis of the front fork where the universal joint is perpendicular to the axis of rotation which eliminates torque steer. Alternatively, the universal joint can be located proximate the gearbox 208 which then requires a telescoping shaft 210. A second right angled gearbox 212 attaches to the distal end of the shaft 210 and engages a substantially vertical shaft 214 that engages the front wheel hub to supply power to the front wheel. The second right angled gearbox 212 is mounted ahead of the front fork rotational axis. The second universal joint is typically perpendicular to the axis of rotation, however the universal joint can be located within a range of plus or minus 10 degrees from perpendicular while eliminating torque steer.

The suspension and the front fork are constructed similarly to the suspension 100 and front fork 42 as previously described but include simplifications as allowed by the different drive configuration.

Although the present invention has been described with reference to preferred embodiments, workers skilled in the art will recognize that changes may be made in form and detail without departing from the spirit and scope of the invention.

The invention claimed is:

1. An all wheel drive motorcycle having handlebars, the motorcycle comprising:
    a frame supporting an engine having an output shaft and a back wheel;
    a front fork attached to the frame with a suspension where the front fork retains the front wheel with a front wheel axle wherein the front fork includes an axis of rotation;
    a back wheel drive train supplying power from the output shaft to the back wheel; and
    a front wheel drive train supplying power from the output shaft to the front wheel wherein the front wheel drive train comprises:
        a universal joint supported by the front fork and wherein the universal joint is located within a range of ten degrees from perpendicular to the axis of rotation of the front fork such that torque steer is substantially eliminated when steering the all wheel drive motorcycle;
        an output drive sprocket fixedly attached to the output shaft;
        a first stub shaft attached to the universal joint;
        a first intermediate fork sprocket attached to the stub shaft; and
        a front wheel main drive chain attached to both the output drive sprocket and the intermediate fork sprocket wherein the path of travel of the front wheel main drive chain forms an obtuse angle.

2. The motorcycle of claim 1 and wherein the front wheel drive train further comprises:
    a second stub shaft extending from the universal joint;
    a second intermediate fork sprocket attached to the second stub shaft located on an opposite side of the universal joint from the first intermediate fork sprocket;
    a front hub sprocket attached to the front hub; and
    a substantially vertical chain attaching the front hub sprocket to the second intermediate fork sprocket such that the output shaft supplies power to the front wheel.

3. An all wheel drive motorcycle having handlebars, the motorcycle comprising:
    a frame supporting an engine having an output shaft and a back wheel;
    a front fork attached to the frame with a suspension where the front fork retains the front wheel with a front wheel axle wherein the front fork includes an axis of rotation;
    a back wheel drive train supplying power from the output shaft to the back wheel;
    a front wheel drive train supplying power from the output shaft to the front wheel wherein the front wheel drive train comprises a universal joint supported by the front fork and wherein the universal joint is located within a range of ten degrees from perpendicular to the axis of rotation of the front fork such that torque steer is substantially eliminated when steering the all wheel drive motorcycle; and
    wherein the front wheel drive train provides an underdrive to the front wheel when compared to the back wheel such that the front wheel will rotate at a slower speed than the back wheel when power is supplied to both wheels.

4. An all wheel drive motorcycle having handlebars, the motorcycle comprising:
    a frame supporting an engine having an output shaft and a back wheel;
    a front fork attached to the frame with a suspension where the front fork retains the front wheel with a front wheel axle wherein the front fork includes an axis of rotation;
    a back wheel drive train supplying power from the output shaft to the back wheel; and
    a front wheel drive train supplying power from the output shaft to the front wheel wherein the front wheel drive train comprises:
        a universal joint supported by the front fork and wherein the universal joint is located within a range of ten degrees from perpendicular to the axis of rotation of the front fork such that torque steer is substantially eliminated when steering the all wheel drive motorcycle;
        a first shaft mechanically linked to the output shaft;
        a first right angled gear box engaging the shaft; and
        a second shaft extending from the first right angled gear box and engaging a second universal joint located with its pivot axis located within a range of plus or minus ten degrees from perpendicular with the axis of rotation the front fork such that torque steer is minimized.

5. The motorcycle of claim 4 and further comprising:
    a second right angled gear box attached to a distal end of the second shaft; and
    a third shaft engaging the second right angled gearbox and the front wheel such that power is supplied to the front wheel from the output shaft.

6. The motorcycle of claim 1 and wherein the universal joint is aligned substantially perpendicular to the axis of rotation of the front fork.

7. The motorcycle of claim 1 and wherein the front fork comprises:
    an upper portion that attaches to the suspension;
    a right side portion that extends from the upper portion and engages a right end of the front axle;
    a substantially horizontal portion extending substantially perpendicular from the upper portion, wherein the substantially horizontal portion has a length greater than a thickness of the front wheel and wherein the horizontal portion attaches to the suspension; and a left side portion attached to the substantially horizontal portion and spaced from the right side portion wherein the left side portion engages the left end of the front axle wherein the front fork does not interfere with the operation of the front wheel drive train.

8. An all wheel drive motorcycle having handlebars, the motorcycle comprising:
- a frame supporting an engine having an output shaft and a back wheel;
- a front fork attached to the frame with a suspension where the front fork retains the front wheel with a front wheel axle wherein the front fork includes an axis of rotation wherein the suspension comprises:
    - an upper suspension arm attached to the front fork at with an upper front attachment mechanism and wherein the upper front attachment mechanism aligns with the rotational axis of the front fork and wherein the upper suspension arm attaches to the frame with first and second upper frame attachment mechanisms that are spaced apart from each other; and
    - a lower suspension arm spaced apart from the upper suspension arm and attached to the front fork at with a lower front attachment mechanism and wherein the lower front attachment mechanism aligns with the rotational axis of the front fork and wherein the lower suspension arm attaches to the frame with first and second lower frame attachment mechanisms that are spaced apart from each other:
- a back wheel drive train supplying power from the output shaft to the back wheel; and
- a front wheel drive train supplying power from the output shaft to the front wheel wherein the front wheel drive train comprises universal joint supported by the front fork and wherein the universal joint is located within a range of ten degrees from perpendicular to the axis of rotation of the front fork such that torque steer is substantially eliminated when steering the all wheel drive motorcycle.

9. The motorcycle of claim 8 and wherein the first and second upper frame attachment members are on opposite sides of a midplane of the motorcycle.

10. The motorcycle of claim 8 and wherein the first and second lower frame attachment members are on opposite sides of a midplane of the motorcycle.

11. The motorcycle of claim 8 and wherein the suspension further comprises a shock absorber attached to the frame and one of the suspension arms.

12. An all wheel drive motorcycle An all wheel drive motorcycle having handlebars, the motorcycle comprising:
- a frame supporting an engine having an output shaft and a back wheel;
- a front fork attached to the frame with a suspension where the front fork supports retains the front wheel with a front wheel axle wherein the front fork includes an axis of rotation;
- a back wheel drive train supplying power from the output shaft to the back wheel; and
- a front wheel drive train supplying power from the output shaft to the front wheel wherein the front wheel drive train comprises a universal joint supported by the front fork and wherein the universal joint is located within a range of ten degrees from perpendicular to the axis of rotation of the front fork such that torque steer is substantially eliminated when steering the all wheel drive motorcycle; and
- a steering mechanism attaching the handlebars to the front fork, the steering mechanism comprising:
    - a rocker member pivotally attached to the front fork wherein the rocker member pivots in a vertical plane; and
    - left and right tie rods spaced apart from each other, each tie rod having one end pivotally attached to the handlebar and an opposite end pivotally attached to the rocker member wherein the left and right tie rods pivotally move in the horizontal plane.

13. An all wheel drive motorcycle comprising:
- a frame supporting an engine having an output shaft and a back wheel attached to the frame;
- an upper suspension arm to the frame with first and second upper frame attachment mechanisms that are space apart from each other and having an upper front attachment mechanism and wherein the upper front attachment mechanism that aligns with a rotational axis of front fork being attached to the frame with upper and lower front attachment mechanisms where the front fork retains the front wheel with a front wheel axle; and
- a lower suspension arm spaced apart from the upper suspension arm attaches to the frame with first and second lower frame attachment mechanisms that are space apart from each other and having a lower front attachment mechanism that aligns with the rotational axis of the front fork and wherein the lower suspension arm;
- a back wheel drive train supplying power from the output shaft to the back wheel; and
- a front wheel drive train supplying power from the output shaft to the front wheel wherein the front wheel drive train comprises a universal joint supported by the front fork and wherein the universal joint axis of rotation is located perpendicular to the axis of rotation of the front fork within a range of plus or minus 10 degrees such that torque steer is substantially eliminated when steering the all wheel drive motorcycle.

14. An all wheel drive motorcycle of claim 13 and further comprising a coil spring shock absorber attached to the frame and one of the suspension arms.

15. The all wheel drive motorcycle of claim 13 and wherein the universal joint is substantially aligned perpendicular to the axis of rotation of the front fork.

16. The all wheel drive motorcycle of claim 13 and wherein the front wheel drive train comprises at least one drive chain of a constant length.

17. The all wheel drive motorcycle of claim 13 and wherein the first and second upper frame attachment members are on opposite sides of a midplane of the motorcycle.

18. The all wheel drive motorcycle of claim 13 and wherein the first and second lower frame attachment members are on opposite sides of a midplane of the motorcycle.

* * * * *